United States Patent [19]
Hommema

[11] Patent Number: 6,158,208
[45] Date of Patent: Dec. 12, 2000

[54] MULTIPLEXED FLUID CONTROL SYSTEM WITH PRESSURE TRANSDUCER FEEDBACK

[75] Inventor: Edward L. Hommema, Rockford, Ill.

[73] Assignee: Woodward Governor Company, Rockford, Ill.

[21] Appl. No.: 09/206,104

[22] Filed: Dec. 4, 1998

[51] Int. Cl.[7] .................................................. F02C 9/00
[52] U.S. Cl. ................ 60/39.281; 137/885; 137/119.09; 137/119.1
[58] Field of Search .................. 60/39.281; 137/885, 137/119.09, 119.1, 596.15; 91/361, 461, 459, 521

[56] References Cited

U.S. PATENT DOCUMENTS

| | | | |
|---|---|---|---|
| 4,716,723 | 1/1988 | Ralston et al. ...................... | 60/39.281 |
| 4,913,032 | 4/1990 | Wernberg ................................. | 91/361 |
| 4,966,065 | 10/1990 | Wardle ..................................... | 91/361 |
| 4,984,505 | 1/1991 | Leeson et al. ............................ | 91/361 |
| 4,986,305 | 1/1991 | Richards et al. ................... | 137/625.15 |
| 5,048,394 | 9/1991 | McLevige et al. ....................... | 91/361 |
| 5,054,369 | 10/1991 | Wardle et al. ............................. | 91/361 |
| 5,081,903 | 1/1992 | Wardle et al. ............................. | 91/361 |
| 5,088,383 | 2/1992 | Wardle et al. ............................. | 91/361 |
| 5,551,478 | 9/1996 | Veilleux Jr. et al. .............. | 137/596.15 |
| 5,845,484 | 12/1998 | Maker .................................. | 60/39.281 |
| 5,996,464 | 12/1999 | McLevige et al. ....................... | 91/361 |

FOREIGN PATENT DOCUMENTS 2 174 824  11/1988  United Kingdom ............ F15B 13/07

*Primary Examiner*—Charles G. Freay
*Attorney, Agent, or Firm*—Leydig, Voit & Mayer, Ltd.

[57] ABSTRACT

A multiplexed hydraulic control system includes a pressure transducer fluidically connected to the multiplexer for sequential or periodic connection to a plurality of channels. The multiplexed hydraulic control system provides hydraulic control flows to a plurality of second stage valves while simultaneously multiplexing the pressure transducer. The pressure transducer may be multiplexed to multiple second stage valves or actuators to provide multiplexed feedback for closed loop control of the second stage valves. The system may be used to split or throttle fuel flow to the nozzles of a combustion chamber in turbine engines.

23 Claims, 5 Drawing Sheets

MULTIPLEXED FLUID CONTROL SYSTEM WITH PRESSURE TRANSDUCER FEEDBACK

FIELD OF THE INVENTION

This invention generally relates to fluid control systems, and more particularly to multiplexed fluid control systems.

BACKGROUND OF THE INVENTION

The concept of multiplexing a hydraulic or pneumatic control to multiple hydraulic or pneumatic actuators or valves is not broadly new. There are several such multiplexed fluid control systems, and this invention would represent a significant advantage in connection with them. U.S. Pat. Nos. 4,913,032, 4,966,065, 4,984,505, 5,048,394, 5,054,369, 5,081,903, and 5,088,383 all assigned to the present assignee, and 4,986,305 assigned to General Electric Company show forms of multiplexed fluid control systems, all of which are hereby incorporated by reference. As exemplified by these aforementioned patents, multiplexed fluid systems typically comprise a modulating valve for producing a controlled output flow and a multiplexer for distributing the controlled output flow to a plurality of second stage valves and/or actuators.

Although other applications exist, one exemplary and very significant application of multiplexed hydraulic control systems is for gas turbine engines, both land based and aircraft types. Gas turbine engines commonly use multiple hydraulic actuators for adjusting their mechanical variables. Mechanical variables can include air valves, fuel valves, hydraulic system pressures, fluid flow rates, engine variable geometry and the like. As engine designers attempt greater performance from the gas turbine engine, the number of mechanical variables desired to be controlled has increased. Applicant is aware of a current desire to variably meter or throttle fuel to individual nozzles or groups of nozzles in a gas turbine engine combustion chamber.

Significant cost and weight advantages exist in using hydraulically multiplexed control systems as opposed to separate hydraulic control systems in which a dedicated hydraulic control for each mechanical variable is necessary. However to realize the cost and weight advantages, it is typically necessary for hydraulically multiplexed control systems to match or exceed the performance achieved by non-multiplexed hydraulic control systems. To provide similar performance as non-multiplexed systems, multiplexed systems need to have precise and reliable closed loop control for variably positioned actuators. Heretofore, closed loop control for hydraulic multiplexed control systems has been provided by a plurality of position sensors and/or potentiometers connected to each variably positioned actuator. By using multiple position sensors, the position of each actuator has been known at all times during operation which provides for reliable control. However, a significant drawback with position sensors has been that they require an undesirable number of components and feedback wiring to provide closed loop control which can undesirably increase costs, increase weight, decrease reliability, and take up valuable space.

SUMMARY OF THE INVENTION

In view of the foregoing, it is a general aim of the present invention to provide a simplified approach for closed loop control in multiplexed hydraulic or pneumatic fluid control systems.

Yet another aim of the present invention is to broaden the possible applications and uses for multiplexed fluid control systems while maintaining accurate and fast response performance.

In view of the foregoing aims, it is an object of the present invention to reduce the number of feedback components necessary to provide for reliable closed loop control of multiplexed fluid control systems.

It is also a related subsidiary object of the present invention to provide a multiplexed hydraulic control system with closed loop control for throttling or metering flow along multiple fluid passages.

It is therefore a feature of the present invention to provide a multiplexed fluid control system that multiplexes a pressure transducer to a plurality of system fluid parameters while also multiplexing the controlled output flow of a modulating valve to a plurality of outputs. The multiplexed fluid control system includes a multiplexing valve having a position that determines the parameter that the pressure transducer is connected with and the output the modulating valve is connected with.

It is another feature of the present invention to provide a multiplexed fluid control system that multiplexes a pressure transducer among several of the valve devices to provide for closed loop control. By multiplexing the pressure transducer among the valve devices, the pressure transducer provides multiplexed feedback indicative of the position of each valve device on a multiplexed basis. An electronic controller uses the multiplexed feed back signal to calculate the positions of the valve devices. The electronic controller then matches the calculated positions with demanded positions to generate a command signal to the modulating valve which sets the demanded positions of the valve devices. It is an advantage that the pressure transducer reduces the components necessary for closed loop control of multiple second stage valves or other such valve devices.

According to one embodiment of the present invention, the pressure transducer is multiplexed by the fluid multiplexer through the same outputs provided for hydraulic control of the valve devices.

According to another embodiment of the present invention, the fluid multiplexer provides two sets of inputs and outputs for multiplexing the pressure transducer and the modulating valve separately. It is an advantage of this embodiment that the pressure transducer can sense other hydraulic system parameters unrelated to the controlled valve devices.

It is a related feature of the preferred embodiment that a pressure transducer provides closed loop control of second stage valves for controlling flow rates among multiple fluid passages. Second stage valves have been adapted to throttle fluid flowing from an inlet to an outlet. An exemplary application of the first and second embodiments is for throttling or splitting fuel flow to nozzles and/or through manifolds.

These and other objects and advantages of the invention will become more apparent from the following detailed description when taken in conjunction with the accompanying drawings.

Figure 1:
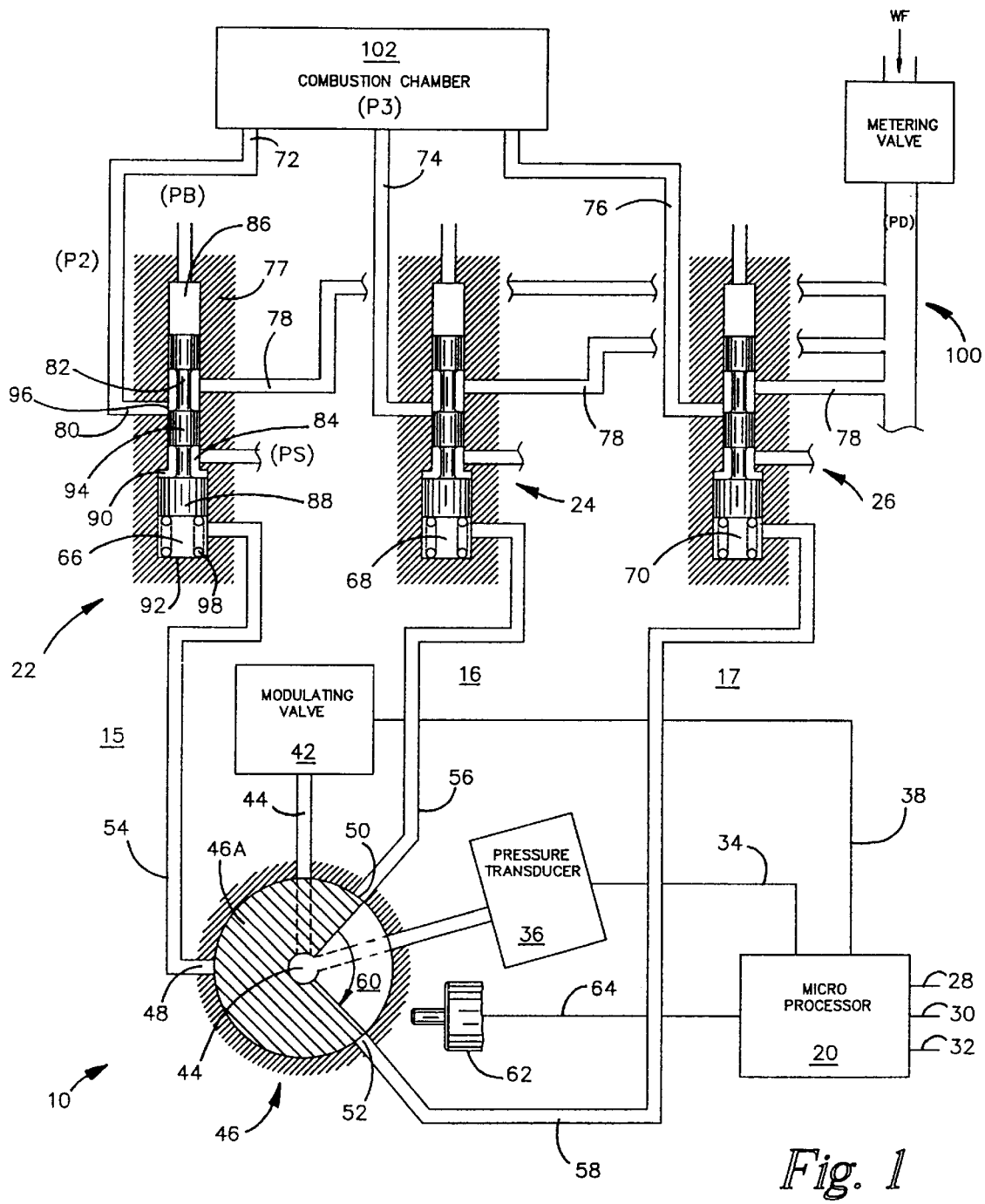
FIG. 1 is a schematic illustration showing a multiplexed hydraulic control system according to a first preferred embodiment of the present invention.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENTS

Turning now to FIG. 1, a preferred embodiment of the present invention is illustrated as a time division multiplexed hydraulic control system 10 having a single set of channels. For simplicity of description and illustration, FIG. 1 illustrates a system having only three channels generally indicated at 15, 16, and 17. An electronic control means illustrated as microprocessor 20, coordinates the elements of the system and establishes control signals and set points for positioning multiple second stage valves 22, 24, 26 in each of the channels 15, 16, 17 respectively.

In operation, the microprocessor 20 receives a demand signal for each second stage valve on an electrical input, shown as three input lines 28, 30, 32. The microprocessor processes those demand signals along with multiplexed feedback signals received along a feedback line 34 from a pressure transducer 36 to produce electrical control signals for controlling the demanded position for each second stage valve. The electrical control signals are sent sequentially in respective time slots along a bus 38 to a fluid control shown schematically as modulating valve 42. The modulating valve 42 responds to the electrical control signals, producing a sequence of hydraulic signals which are output in a fluid control conduit 44. The hydraulic signals are representative of the electrical control signals on the bus 38 and are in the same sequence. Each individual hydraulic signal is then directed by a multiplexer, shown as a rotary commutator 46, to one of the channels 15, 16, 17 in the system. More particularly, the commutator 46 sequentially delivers the hydraulic signals to output ports 48, 50, 52 and via output conduits 54, 56, 58 to respective second stage valves 22, 24, 26.

To properly distribute hydraulic signals, the microprocessor 20 generally coordinates operation of the modulating valve 42 with the angular position of the rotary commutator 46. More specifically, the modulating valve 42 or other fluid control means is commanded by the microprocessor to control the output flow in the conduit 44 based on the rotary position of the commutator 46. It is seen that the commutator 46 has a single commutator element 46a defining an open segment 60 which sequentially connects the controlled output flow in the conduit 44 to the output ports 48, 50, 52. A position feedback device 62 associated with the commutator 46, detects the angular position of the commutator element 46a and transmits a position signal on line 64 to the microprocessor 20. The microprocessor 20 uses the position signal to determine the time slots at which the outputs are open and serviced by the modulating valve 42. The microprocessor 20 sequences the electrical control signals with the time slots so that the corresponding hydraulic signals match the sequential connections between the open segment 60 and the associated second stage valves 22, 24, 26. In an alternative embodiment, it will be appreciated to those skilled in the art that the system and multiplexer can also be controlled to periodically connect the input to the outputs selectively, but not necessarily in a selected predetermined sequence.

In accordance with the present invention, the present embodiment also provides a multiplexed pressure transducer 36 or other multiplexed feedback means for closed loop control of the second stage valves. In a preferred embodiment, the pressure transducer 36 is connected to the rotary commutator 46 to be multiplexed among a plurality of channels. In the present embodiment, the pressure transducer 36 is multiplexed to the same channels 15, 16, 17 provided for the modulating valve 42. The pressure transducer 36 is connected to the conduit 44 (the connection being shown schematically in FIG. 1) to sequentially sense pressure in each of the second stage valves 22, 24, 26 and thereby provide multiplexed feedback signals to the microprocessor 20. By connecting the pressure transducer 36 to the conduit 44, the pressure transducer 36 is in continuous fluid communication with the single commutator element 46a and the open segment 60. In the present embodiment, the pressure transducer 36 sequentially senses pressures in associated control chambers 66, 68, 70 as the outputs 48, 50, 52 are sequentially connected and disconnected by the open segment 60.

Because the pressure transducer 36 operates in corresponding sequence with the rotary commutator 46, individual feedback signals on line 34 to the microprocessor 20 are also multiplexed in identifiable time slots. The microprocessor 20 receives and separates the multiplexed signal into individual feedback signals on line 34 by utilizing the position signal received from the position sensor 62. As will be explained in greater detail below, the microprocessor 20 then processes individual feedback signals to either calculate the position of each second stage valve or a flow rate through the second stage valves. Thus, the feedback signal is compared or matched with the demand signal as explained above.

At this point, attention will be directed in greater detail to the second stage valves located in channels 15, 16, and 17. In this particular embodiment illustrated in FIG. 1, the second stage valves 22, 24, 26 have been adapted to control a mechanical variable function directly. More specifically, the second stage valves have been adapted to function as throttling mechanisms to throttling flow along fluid passages 72, 74, 76 respectively. Although throttling second stage valves are shown in FIG. 1, it will be appreciated to those skilled in the art that other forms of valve devices, such as servo actuators for example, can be connected to the outputs 48, 50, 52 and the pressure transducer 36.

The detailed structure of an exemplary second stage valve will be described with reference to valve 22. It may be seen that valve 22 is associated with one fluid passage 72 which passes through the valve body 77 with fluid flowing from an inlet 78 at pressure (PD) to an outlet 80 at pressure (P2). The second stage valve 22 has a control chamber 66 for receiving the hydraulic signals from the modulating valve 42 to control the position of a spool 82. As seen in FIG. 1, each valve also has a high pressure chamber 84 receiving high pressure source (PS), and a low pressure chamber 86 vented to sump (PB).

To vary flow rates among fluid passages 72, 74, 76, the valves 22, 24, 26 integrate the controlled multiplexed output flow furnished by the modulating valve 42. More specifically, a hydraulic control signal received by the control chamber 66 engages a control chamber land 88 of the valve 22 to axially translate the spool 82 to a predetermined position. When the modulating valve 42 supplies additional fluid pressure to the control chamber 66, the spool 82 is forced higher causing fluid to exit the opposite sump chamber 86. When the modulating valve 42 supplies a sump or negative hydraulic signal, fluid is drained from the control chamber 66 and the spool 82 is forced downward. When the rotary commutator 46 is servicing another channel or is between channels, the fluid in conduit 54 is trapped and spool 82 holds its position. Thus, each second stage valve is acting as a sample and hold mechanism.

The spool 82 has a limited range of axial translation in the valve body 77 as control chamber 66 and its associated land 88 are larger than other chambers and lands in the valve. A valve body stop 90 restricts control chamber land 88 and therefore axial translation of the spool 82 upward, while the valve body base 92 limits axial translation downward. The limited range does not permit fluid communication between the fluid passage 72 and the pressure source (PS) or the sump (PB).

Within the range of movement for the spool 82, the throttling land 94 can be translated through a controlled range of positions. The position of the throttling land 94 meters fluid along fluid passage 72 by changing the size of an orifice opening 96 to the outlet 80. The flow rate along fluid passage 72 is proportional to the size of the orifice opening 96 which provides for a pressure drop. Thus, the position of spool 82, which determines the size of orifice opening 96, controls the flow rates along the fluid passages.

To provide for calculation of second stage valve position in the present embodiment, each second stage valve has a spring 98 engaging the spool 82. The spring 98 provides means for calculating spool position from a pressure measurement. More specifically, the spool 82 takes an axial position proportional to its modulated pressure in control chamber 66, because the force stored in the spring 98 is proportional, usually in a linear manner, to axial length of the spring 98. It can also be understood that valve spool position determines flow rate through flow passage 72 because the size of orifice 96 is controlled by the axial position of the spool 82.

An exemplary application of the second stage valves as illustrated in FIG. 1 is to throttle fuel from a fuel manifold 100 to individual nozzles or groups of nozzles in a gas turbine combustion chamber, as indicated schematically at 102 and having known pressure (P3). To practice this preferred application of the embodiment, the inlets 78 are located on individual branches of a fuel manifold 100, with the passages to the nozzles being indicated by the flow passages 72, 74, 76. In the exemplary application of variably throttling fuel, the flow rate along fluid passages 72, 74, 76 can be calculated. In the present application, the upstream pressure in the fuel manifold (PD) provided by a fuel metering unit is known and the combustion chamber pressure (P3) is known. By having upstream and downstream discharge pressures known, and knowing the flow vs. pressure drop characteristics of the nozzles (not shown), the flow rate through each second stage valve can be readily calculated.

At this point it is apparent that several aspects of the present invention have been exemplified by FIG. 1. In accordance with the aims, objectives and features, the embodiment in FIG. 1 exemplifies a pressure transducer multiplexed to a plurality of channels by the same multiplexer which selectively distributes the controlled flow from the modulating valve. By using the multiplexer for dual purposes, the pressure sensing system and the hydraulic power system share components of the multiplexer, the output conduits, and the multiplexer position sensor. Also exemplified in FIG. 1 is a pressure transducer multiplexed to second stage valves for closed loop control purposes. Inclusion of the pressure transducer eliminates the need for multiple feedback devices and lines as used in prior hydraulic multiplexed systems for closed loop control of the system.

Figure 2:
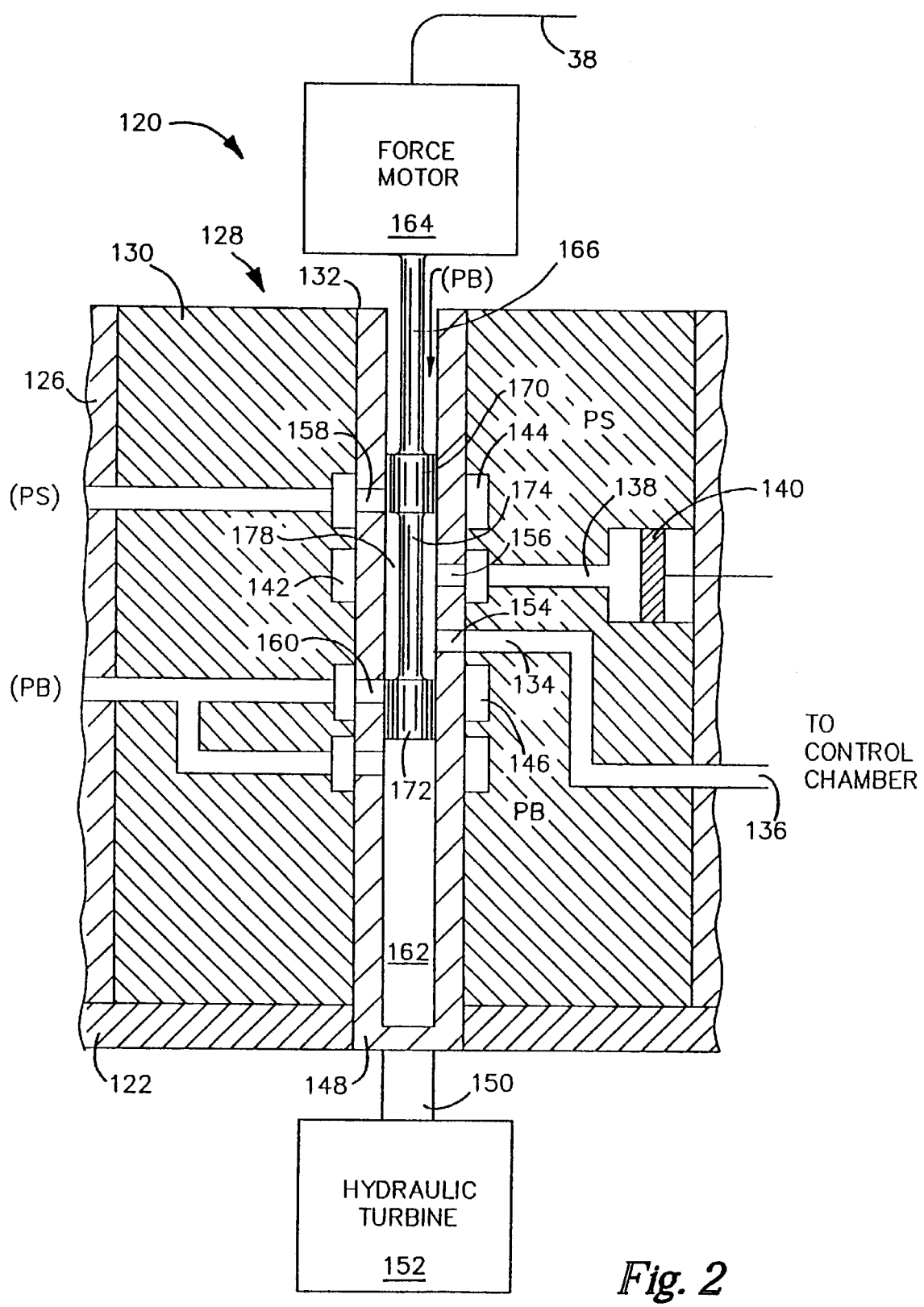
FIG. 2 illustrates in greater detail a partly schematic cross sectional view of the modulating valve and multiplexer mechanically exemplifying the embodiment of FIG. 1.

The cross sectional view of FIG. 2 illustrates an exemplary mechanical implementation of the pressure transducer, modulating valve and multiplexer of FIG. 1, generally indicated as a modulating valve assembly 120. The assembly 120 is built on a base member 122 which carries a valve body 126 having a plurality of ports therein. Mounted within the valve body 126 is a valve insert generally indicated at 128 which includes both the modulating control member and the multiplexing means.

The valve insert 128 comprises a fixed member 130 having a cylindrical shaft 132 with output openings and output conduits extending outward therefrom. Although only one output opening 134 and one output conduit 136 is shown in FIG. 2, it may be appreciated that the valve insert includes multiple output openings and conduits radially about the axis of the cylindrical shaft as is generally illustrated in FIG. 1. Thus, output conduit 136 could be considered one of the conduits 54, 56, 58 indicated in FIG. 1. To multiplex the pressure transducer, the valve insert 128 includes a pressure duct 138 connecting a pressure transducer 140 to a pressure transducer port 142. It is seen that the fixed member 130 also provides a high pressure port 144 (PS) for positive hydraulic signals and a sump port 146 (PB) for negative hydraulic signals.

To provide the multiplexer, the valve insert 128 includes a cylindrical sleeve 148 closely fitted for rotation in the fixed member 130. The sleeve 148 is connected to an axle 150 to receive rotary movement from any form of a rotary power source, the present embodiment schematically indicating a hydraulic turbine 152. The sleeve 148 has an open input segment 154 for sequentially connecting and disconnecting the modulating valve to different hydraulic outputs as the sleeve 148 rotates. As seen in FIG. 2 the open segment 154 has been opened to output conduit 136. The sleeve also provides openings 156, 158, 160, for continuous fluid communication of the ports 142, 144, 146 with the interior of the sleeve 148 generally indicated as hollow cavity 162. It can be understood that ports 142, 144, 146 comprise annular grooves in the fixed member 130 so that rotation of the sleeve 148 does not restrict fluid communication of the pressure transducer, high pressure source (PS), and sump (PB) with the inside cavity 162.

To provide a controlled output flow, a high performance actuator, shown schematically as force motor 164, drives a modulating spool valve 166 inside the cylindrical sleeve 148 according to electric inputs received along bus 38 from the microprocessor 20 (not shown in FIG. 2). The force motor in the preferred embodiment may be any such motor which takes a linear position as a function of applied electrical current, such as a voice coil or a torque motor for example. The spool 166 has an enlarged cylindrical portion closely fitting in the cavity 162 with an upper metering land 170 for creating positive flow signals and a lower metering land 172 for creating negative or sump signals. The spool 166 has a recessed portion 174 between the lands 170, 172 forming a conduit 178 for controlled flow within the sleeve 148, similar to the schematically illustrated conduit 44 of FIG. 1.

As shown in FIG. 2, the spool 166 is at a null position. At the null position, the force motor 164 positions the spool 166 so that neither the pressure source (PS) or the sump (PB) is in fluid communication with the conduit 178 and the open conduit 136. The metering lands 170, 172 form a tight fit with the openings 158, 160 to prevent fluid from flowing through the open output conduit 136 at null.

When the force motor 164 receives an electrical signal on bus 38 to furnish a hydraulic signal, the force motor 164 axially translates the spool 166 within the rotating sleeve 148. When the force motor 164 receive a signal on bus 38 for a positive hydraulic signal, the force motor 164 translates the spool 166 upward to control an output flow from the high pressure source (PS) and thereby create a positive hydraulic signal. More specifically, fluid is metered by upper metering land 170 as land 170 predetermines the size of the orifice between the high pressure opening 158 and the conduit 178. Likewise, when the force motor 164 receives an electric signal on bus 38 to produce a negative hydraulic signal, the force motor 164 forces the spool 166 downward connecting the sump (PB) instead of the high pressure source (PS) to the conduit 178 and to the current open output conduit 136. Flow is then withdrawn from the conduit 178 and is similarly metered by the lower land 172 as done by the upper land 170 for positive signals.

Although the sump (PB) and the pressure source (PS) are selectively connected to the conduit 178, the pressure transducer 140 via duct 138 is continuously connected to the conduit 178 in the present embodiment exemplified by FIG. 2. To ensure the continuous connection of the pressure transducer to conduit, the two metering lands 170, 172 are separated at a sufficient distance. The continuous connection permits the pressure transducer 140 to sense pressure associated with each output connected by the open segment 154. An advantage of the present embodiment is that when the open segment 154 is between channels as was shown in FIG. 1, the spool 166 can also be raised or lowered to measure either the pressure source (PS) or the sump (PB).

Figure 3:
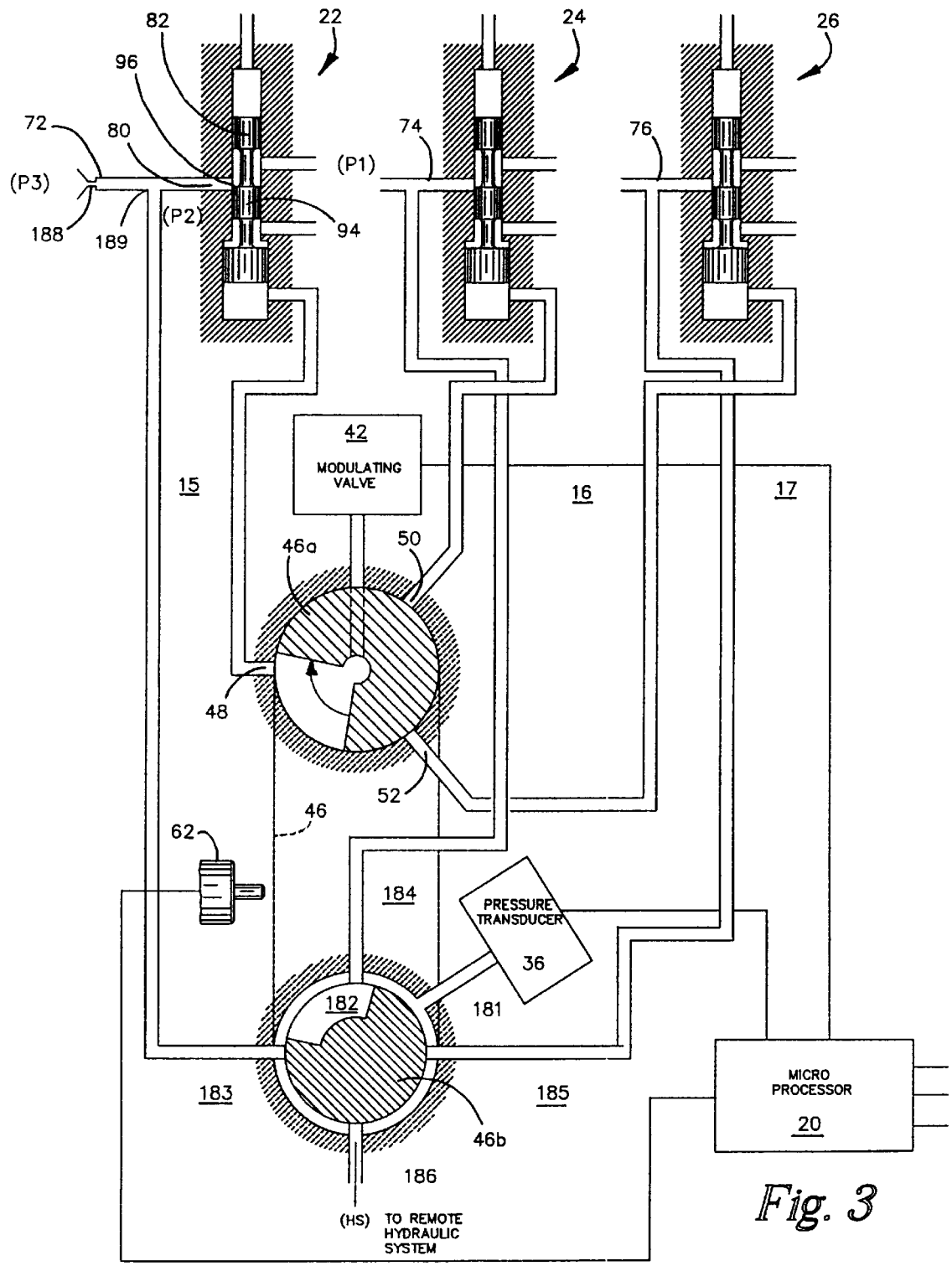
FIG. 3 is a schematic illustration showing a multiplexed hydraulic control system in accordance with a second preferred embodiment of the present invention.

Turning now to other embodiments, FIG. 3 is a schematic drawing exemplifying another preferred embodiment of the invention. It will be understood that the embodiment of FIG. 3 operates in a similar manner to the embodiment of FIG. 1, and as such, similar elements are commonly numbered to provide for easier understanding and only material differences between the embodiments will be addressed. The embodiment of FIG. 3 illustrates a hydraulically multiplexed control system that provides separate outputs and channels for multiplexing the pressure transducer 36. By separately multiplexing the pressure transducer 36, it will better be appreciated that the pressure transducer can have separate channels and can be adapted for other pressure sensing applications. Also shown in FIG. 3 is a modified closed loop control application of the present invention, with the pressure transducer 36 measuring pressure in the flow passages 183, 184, and 185 instead of the control chambers 66, 68, 70 to calculate flow rates.

As exemplified in the present embodiment and in accordance with the aims, objects and features of the present invention, the pressure transducer 36 is multiplexed to several channels, shown as output channels 183, 184, 185, 186 in FIG. 3, using the same multiplexer or rotary commutator 46 that selectively distributes the hydraulic signals from the modulating valve 42. By using the same commutator 46, the position feedback device 62 is shared by the modulating valve 42 and pressure transducer 36. The position feedback device 62 indicates time slots for measuring the pressure in passages 183–186 without reducing hydraulic power performance from the hydraulic control system.

An advantage of the second embodiment is that the pressure transducer 36 may sense pressures in other systems. To provide this in the present embodiment, the rotary commutator 46 comprises a second commutator element 46*b* in addition to the commutator element 46*a*. It is seen that the pressure transducer 36 is continuously connected to a second commutator element 46*b* by an independent conduit 181. As the commutator 46 rotates, the pressure transducer is sequentially connected by a second open slot segment 182 in the commutator element 46*b* to separate outputs and channels 183–186. By using separate outputs, the pressure transducer 36 can have separate channels not associated with second stage valves 22, 24, 26. The pressure transducer 36 can also have a different number of outputs than the hydraulic control system. To illustrate this feature, it is seen that the embodiment of FIG. 3 comprises four outputs and four corresponding conduits, indicated generally by reference numbers 183–186 with channel 186 being connected to sense pressure in a separate channel or parameter, indicated in FIG. 3 as hydraulic system pressure (HS). Because the rotary element 46*b* rotates concurrently and simultaneously with rotary element 46*a*, the position feedback device 62 also indicates the time slots for the pressure transducer and channels 183–186 in a similar manner as for outputs 48, 50, 52.

In addition to sensing remote system pressures, the pressure transducer provides for closed loop control of second stage valves. Similar to the first embodiment of FIG. 1, the pressure transducer in the second embodiment is fluidically connected to multiple second stage valves 22, 24, 26 for closed loop control. Although all of the second stage valves are sequentially connected to the pressure transducer in the embodiment of FIG. 3, it should be appreciated that fewer than or more than three valves may be connected to the pressure transducer as desired.

Because the commutator 46 rotates cyclically, the pressure transducer 36 provides sequenced pressure sensed feedback on a time multiplexed basis to the microprocessor 20. Using the signal received from the position detection device 62, the microprocessor 20 determines which second stage valve is connected to the pressure transducer 36. An advantage of separating the hydraulic control outputs from the pressure transducer outputs is that the pressure transducer 36 can lead the modulating valve 42. Assuming the commutator is rotating clockwise as shown in FIG. 3, when the pressure transducer is connected to passage 184 of valve 24 via segment 46*b*, the modulating valve can be connected to passage 48. By leading the modulating valve, the pressure transducer 36 can provide adequate time for the microprocessor 20 to calculate the desired flow required in passage 50 when it is time to position valve 24. This improves control.

An alternative approach to measuring flow rate in fluid passages 72, 74, 76 is also shown in FIG. 3. More specifically, it is seen that the pressure transducer 36 is fluidically connected to the outlets of the second stage valves 22, 24, 26 and not the control chambers. However, it will be appreciated that channels 183–185 alternatively could be connected to the control chambers instead of the outlets as desired. Similar to the embodiment of FIG. 1, the pressure transducer 36 provides feedback for calculation of flow rate through each second stage valve. To practice this application of the present invention and using valve 22 as exemplary, the pressure transducer is connected downstream of the outlet 80 and upstream of a known sized orifice restriction 188 which could be a nozzle for discharging fuel into a combustion chamber. As shown in FIG. 3, the pressure transducer is fluidically connected to the second stage valve by intersection 189, to measure pressure (P2) downstream of the outlet 80 and upstream of restriction 188.

To elaborate on how flow rate is calculated, it should be recalled that the position of the throttling land 94 meters fluid along fluid passage 72 by changing the size of a orifice opening 96 to the outlet 80. It should also be recalled that the size of orifice opening 96 is proportional to the flow rate along fluid passage 72 and provides for a pressure drop. If the restriction size 188 and the downstream pressure (P3) past the restriction 188 are known as is the case in FIG. 3, the flow rate through second stage valve 22 can be calculated by measuring pressure (P2) with the multiplexed pressure transducer:

$$\text{Flow rate} = \text{constant} * (\text{restricted flow area}) * (P2-P3)^{0.5}$$

By calculating the flow in this fashion the microprocessor 20 and modulating valve 42 can position the second stage valves as required to obtain the desired flows in each of the passages 72, 74 and 76. A second stage valve position versus control pressure relationship is not required and therefore the second stage valve springs may be eliminated. Also, accuracy may be improved as friction of the second stage valves is of little importance as the control system electronics will drive the second stage valves to the required position to obtain the desired flows in passages 72, 74, and 76.

Figure 4:
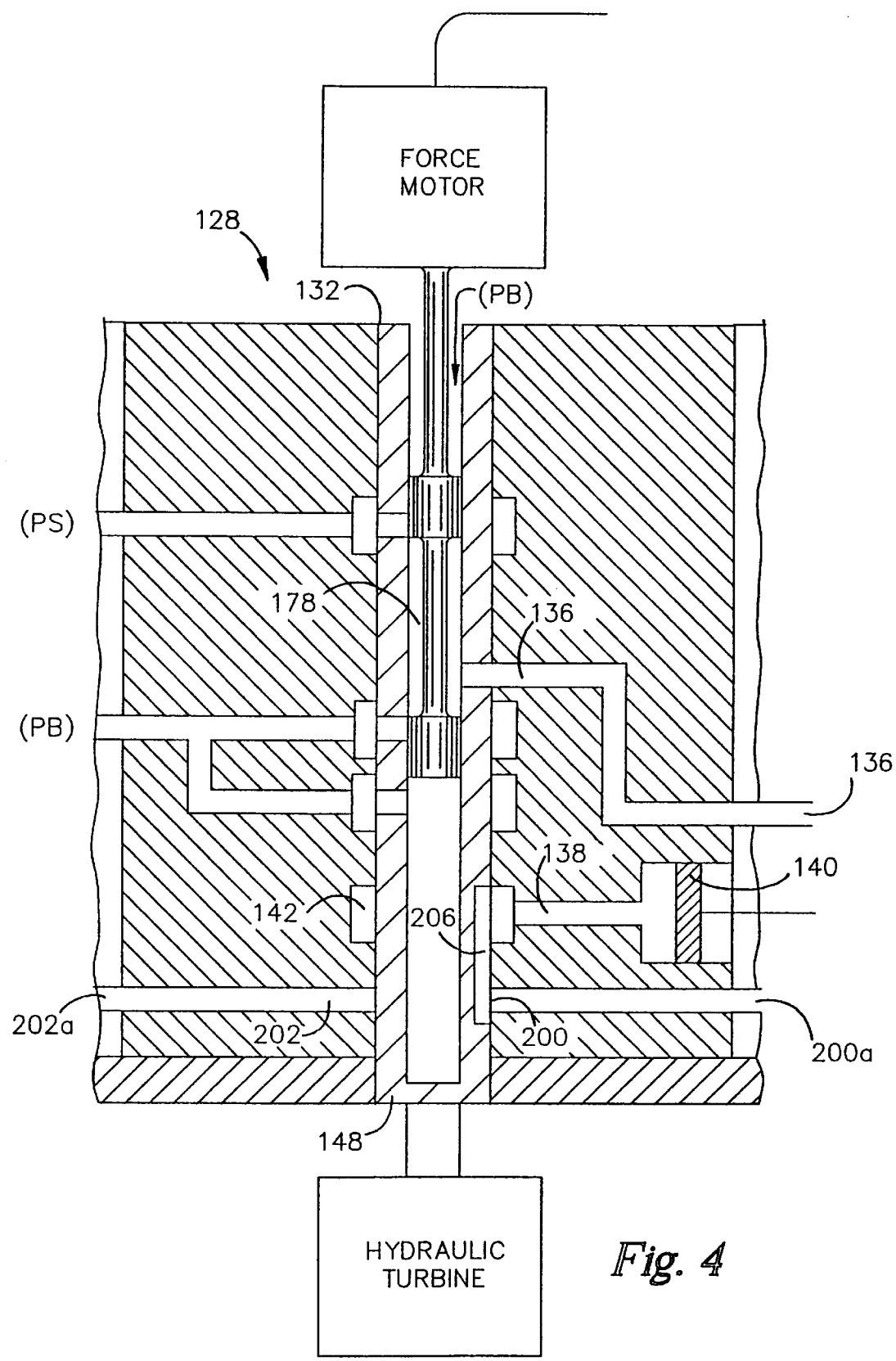
FIG. 4 illustrates in greater detail a partly schematic cross sectional view of a modulating valve and a multiplexer mechanically exemplifying the embodiment of FIG. 3.

FIG. 4 illustrates a mechanical embodiment of the present invention for the application of FIG. 3. The embodiment of FIG. 4 is similar in many respects to that of FIG. 2, except that the pressure transducer while multiplexed by the rotating sleeve 148 is not connected to the multiplexing conduit 178 and as is seen in FIG. 2. In viewing FIG. 4 it can be better appreciated that a pressure transducer can be multiplexed to other channels and adapted for other functions in addition or in alternative to controlling second stage valve positions.

As seen in FIG. 4, the valve insert 128 includes additional set of outputs and output conduits for the pressure transducer. Although FIG. 4 illustrates only two outputs 200, 202 and associated output conduits 200a, 202a for sequential connection to the pressure transducer 140 it will be appreciated that several more outputs may be provided about the inner radial periphery of the valve insert. The pressure transducer 140 is connected to the multiplexing sleeve 148 by an annular pressure port 142 and passage 138. However, the pressure port 142 is no longer connected to the modulating conduit 178. Instead, the pressure port is offset from the outputs 200–203 and is connected by an axial slot 206 extending along radial periphery of the sleeve 148 to sequentially open a second set of outputs. To restrict fluid communication between the pressure transducer 140 and the fluid control conduit 178, the rotating sleeve 148 provides the axially extending slot 206 on the outer surface of the sleeve 148 which does not extend into the inside of the sleeve 148 or the conduit 178. The axial slot 206 sequentially rotates with the sleeve 148 to sequentially connect the pressure transducer 140 to the second set of outputs 200, 202. By separating the hydraulic control outputs from the pressure transducer outputs, the pressure transducer can sense pressure for other hydraulic systems and provide closed loop control for other hydraulic systems. Thus, other pressure sensing applications are achievable in addition to providing feedback for second stage valve position.

Figure 5:
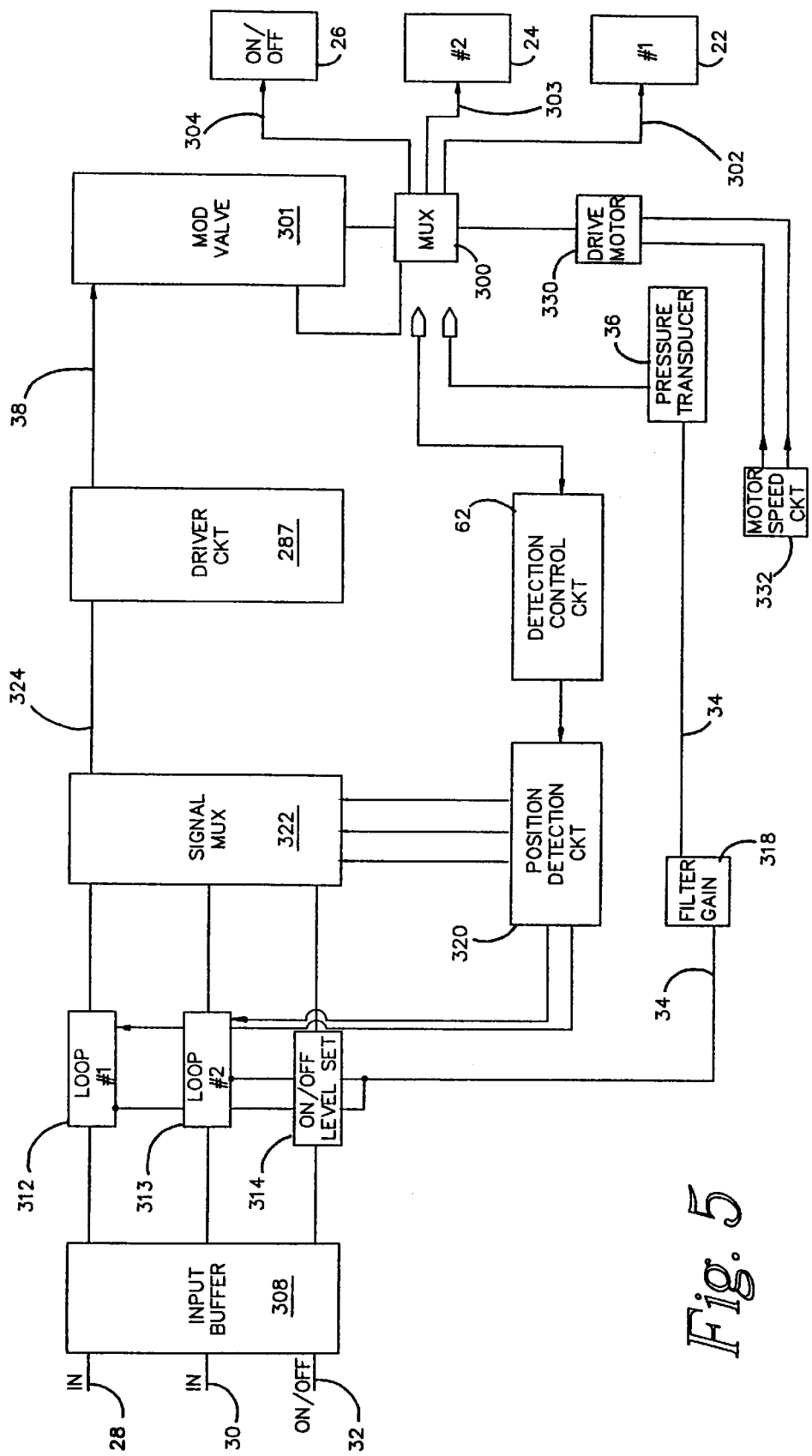
FIG. 5 is a block diagram showing an exemplary multiplexed hydraulic control system in accordance with a preferred embodiment of the present invention.

The closed loop control features for second stage valves provided by a preferred embodiment of the present invention can better be appreciated by reference to FIG. 5. FIG. 5 shows the multiplexer 300 and modulating valve 301 only schematically. It is seen that the modulating valve 301 is connected to the multiplexer 300 to control flow through the multiplexer on a multiplexed basis. It is also seen that pressure transducer 36 is connected to a multiplexer 300 for multiplexing thereby.

The multiplexed hydraulic control system has connections 302, 303, 304 for fluid communication with the second stage valves. In accordance with the two embodiments exemplified in FIGS. 1 and 3, it will be understood that each connection 302–304 may comprise either one set or two sets of outputs and corresponding output conduits, as appropriate. The connections 302–304 comprise one conduit if the pressure transducer is multiplexed through the hydraulic control outputs as is shown in the embodiment of FIG. 1. The connections 302, 303 comprise two conduits if the pressure transducer is multiplexed through a separate set of passages as is shown in the embodiment of FIG. 3.

Referring in greater detail to the closed loop control features of FIG. 5, there is shown an input buffer circuit 308 having three input signals coupled thereto on lines 28, 30, 32 as described in connection with FIGS. 1 and 3 and have levels which relate to a demanded position or flow rate for the associated second stage valves, illustrated schematically in FIG. 5 at 22, 24, 26. The signals having passed through an input buffer circuit 308 are received and sequentially compared in corresponding control loops 312, 313, 314. A multiplexed feedback signal is also received by loops 312, 313 on line 34 from the pressure transducer 36 having passed through a filter and amplifying circuitry 318.

The operation of the control loops 312, 313 is coordinated with the time slots for the pressure transducer as indicated by the position detection device 62 and associated position detector circuit 320. As seen in FIG. 5, second stage valve 26 is schematically illustrated as a common on/off type valve, and hence no pressure sensed feedback is necessary for the associated control loop 314. More specifically, the control loops 312, 313 in a conventional fashion, sequentially sample the demand signal and compare the sampled demand signal with the respective feedback signal to produce an electrical output signal. The loops 312, 313 sample the demand signal when the detection device 62 indicates that the pressure transducer is in fluid communication with the associated second stage valve of the loop. Each control loop establishes electrical output signals which are proportional to the flow intended to be sent to each of the respective second stage valves 22, 24, 26 during the next cycle.

This electrical output signal having been created is coupled to a signaling multiplexer 322. The signaling multiplexer is also coordinated by the position detector 62 and circuit 320. The signaling multiplexer 322 holds each electrical signal while the modulating valve 42 is servicing other channels. It is preferable that the signaling multiplexer hold the electrical signal for as little time as possible. When the position detection device 62 indicates a prospective connection to the corresponding second stage, the signaling multiplexer transmits the corresponding electrical signal. The signaling multiplexer 322 transmits the electrical signal along line 324 to a driver circuit 287 which amplifies the output signals, and then along bus 38 to the linear force motor which operates the modulating valve 301. The electrical signal directs the modulating valve 301 to modulate the flow to the multiplexer 300. The modulated flow is then sequentially distributed to the second stage valves by the multiplexer 300 driven by rotary motor 330 and responsive to motor circuit 332.

What is claimed is:

1. A time multiplexed fluid control system for controlling the positions of multiple valve devices, each valve device having a control chamber, comprising:

a fluid multiplexer having a plurality of positions for selectively connecting an input and a plurality of outputs, one of the outputs fluidically connected to the control chamber of each valve device;

a modulating valve in fluid communication with the input, producing a controlled output flow through the input, the position of the fluid multiplexer determining which of the outputs receive the controlled output flow; and a pressure transducer in fluid communication with the fluid multiplexer and connectable to a plurality of channels thereby, the position of the fluid multiplexer determining which of the channels the pressure transducer is in communication with, the pressure transducer operable to produce a multiplexed feedback signal representative of sensed pressures in the channels.

2. The system of claim 1 wherein a plurality of said valve devices are in fluid communication with channels of the pressure transducer, the multiplexed feedback signal being indicative of the individual positions of said plurality of the valve devices for closed loop control of said plurality of valve devices.

3. The system of claim 2 further comprising a controller selectively matching the multiplexed feedback signal with corresponding demand signals, each demand signal relating to a demanded position for a corresponding valve device, said controller generating a plurality of electrical control signals in response to differences between the multiplexed feedback signal and the demand signals, the electrical control signals commanding the modulating valve to provide controlled output flows which set the demanded positions of the corresponding valve devices.

4. The system of claim 3 further comprising a position detection device in sensory communication with the multiplexer to sense a position thereof, the position detection device outputting said position of the multiplexer to said controller for use therein to determine which of said outputs is connected to the modulating valve and which of said channels is connected to the pressure transducer.

5. The system of claim 4 further comprising means for translating the multiplexer between said plurality of positions in a predetermined selected sequence, whereby the multiplexed fluid control system is time division multiplexed.

6. The system of claim 1 wherein the fluid multiplexer comprises a multiplexing sleeve rotatably disposed within a valve body, the channels and the outputs being disposed in the valve body radially about the sleeve, the modulating valve being a spool valve linearly translatable within the sleeve to produce a plurality of positive and negative fluid power signals.

7. The system of claim 1 wherein the multiplexer includes a second input and a plurality of second outputs for multiplexing the pressure transducer separately from the modulating valve, one channel being in fluid communication with each second output.

8. The system of claim 7 wherein a plurality of the second outputs are fluidically connected to a plurality the valve devices to provide pressure sensed feedback therefrom.

9. The system of claim 1 wherein the pressure transducer is fluidically connected to said input and multiplexed through the outputs on the same time multiplexed basis as the controlled output flows.

10. A time multiplexed fluid control system for controlling the positions of valve devices, each valve device having a control chamber and adapted to control a mechanical variable, comprising:

a fluid multiplexer having an input and a plurality of outputs, one output fluidically connected to the control chamber of each valve device;

means, associated with the fluid multiplexer, for producing a controlled output flow through the input and in each of the outputs to individually control the position of each of the valve devices on a time multiplexed basis;

a pressure transducer in fluid communication with the fluid multiplexer, the fluid multiplexer periodically connecting the pressure transducer to a plurality of the valve devices on a time multiplexed basis, the pressure transducer providing a multiplexed feedback signal indicating a sensed pressure associated with said plurality of the valve devices; and a controller connected to the pressure transducer and the producing means, the controller selectively matching the feedback signal with a demand signal and modifying the controlled output flow in accordance therewith to provide closed loop control of said plurality of the valve devices.

11. The system of claim 10 in which the pressure transducer is fluidically connected to the input and therefore multiplexed through the outputs and fluidically connected to the control chambers on the time multiplexed basis.

12. The system of claim 10 wherein the multiplexing valve further includes a second input and a plurality of second outputs, the pressure transducer connected to the second input, the second input connectable to each of the second outputs whereby the pressure transducer is multiplexed separately from said producing means.

13. The system of claim 10 further including means for translating the fluid multiplexer through a plurality of positions, each position connecting the input to one of the outputs, and further comprising a position feedback device in sensory communication with the fluid multiplexer, the position feedback device indicating to the controller the position of the multiplexing valve.

14. The system of claim 10 wherein the pressure transducer is multiplexed by fluid multiplexer to a plurality of parameters not associated with the valve devices.

15. A time multiplexed hydraulic control system for controlling fluid flow among a plurality of fluid passages comprising the combination of:

a plurality of valve devices, each valve device having a fluid inlet and a fluid outlet connected to one of the fluid passages, each valve device having a control chamber;

a hydraulic multiplexer having an input and a plurality of outputs, one of the outputs being connected to the control chamber of each valve device;

a modulating valve associated with the hydraulic multiplexer, for providing a controlled output flow in each of the outputs to individually control the position of each of the valve devices on a time multiplexed basis, whereby the multiplexer and modulating valve are adapted to set a fluid flow rate through each of the valve devices for each fluid passage; and a pressure transducer fluidically connected to the multiplexer for calculation of the fluid flow rate through the valve devices, the pressure transducer generating a pressure feedback signal to a controller for matching with a flow demand signal, to thereby provide for individual control of the fluid flow rate in the fluid passages.

16. The system as in claim 15 wherein the flow passages are part of a fuel manifold in a gas turbine engine, the flow passages delivering a fuel to a plurality of nozzles individually or in groups for discharge into a combustion chamber for combustion.

17. The system as in claim 15 wherein each valve device is engaged by a spring to have an axial position proportional to pressure in the respective chamber, to thereby permit calculation of valve position and the flow rate through each valve device.

18. The time multiplexed hydraulic control system as in claim 15 wherein the hydraulic multiplexer multiplexes the pressure transducer in a first sequence and the modulating valve in a second sequence, the first sequence being different from the second sequence.

19. A time multiplexed hydraulic control system for controlling fluid flow among a plurality of fluid passages, comprising the combination of:

a plurality of valve devices, each valve device associated with one of the fluid passages and having a position for adapting the fluid flow rate in its associated fluid passage, each valve device having a control chamber, a hydraulic multiplexer having an input and a plurality of outputs, one of the outputs being connected to the control chamber of each valve device, a modulating valve associated with the multiplexer, for providing a controlled output flow in each of the outputs, for individually controlling the position of each of the valve devices on a time multiplexed basis, whereby the multiplexer and modulating valve are adapted to set a fluid flow rate through each of the valve devices for each flow passage; and feedback means multiplexed among the valve devices for providing a multiplexed signal indicative of the fluid flow rates through each of the valve devices, said feedback means providing the multiplexed signal to a controller for matching with a demand signal, to thereby control the fluid flow rate through each of the fluid passages.

20. The system as in claim 19 wherein the feedback means comprises a pressure transducer.

21. The time multiplexed hydraulic control system as in claim 20 in which the flow passages are part of a fuel manifold in a gas turbine engine, the flow passages delivering a fuel to a plurality of nozzles individually or in groups for discharge into a combustion chamber.

22. The system as in claim 20 wherein the input is sequentially connected to the outputs in a predetermined sequence whereby the time multiplexed hydraulic control system is time division multiplexed.

23. The time multiplexed hydraulic control system as in claim 19 in which the feedback means is multiplexed by the hydraulic multiplexer to the valve devices.

* * * * *